United States Patent
Sugimoto et al.

(10) Patent No.: US 11,367,881 B2
(45) Date of Patent: Jun. 21, 2022

(54) METHOD FOR MANUFACTURING FUEL CELL AND FUEL CELL

(71) Applicant: TOYOTA JIDOSHA KABUSHIKI KAISHA, Toyota (JP)

(72) Inventors: Toshiki Sugimoto, Miyoshi (JP); Makoto Yoshida, Toyota (JP); Shunsuke Suzuki, Nisshin (JP); Tomokazu Hayashi, Seto (JP); Shinya Takeshita, Toyota (JP); Takuya Mitsuoka, Nagakute (JP); Yoshitake Suganuma, Nagakute (JP); Yuichi Kato, Nagakute (JP); Kyoko Nakai, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 16/511,532

(22) Filed: Jul. 15, 2019

(65) Prior Publication Data
US 2020/0028187 A1 Jan. 23, 2020

(30) Foreign Application Priority Data
Jul. 20, 2018 (JP) .............................. JP2018-136820

(51) Int. Cl.
| | | |
|---|---|---|
| *H01M 8/0273* | (2016.01) | |
| *H01M 8/2457* | (2016.01) | |
| *H01M 8/0202* | (2016.01) | |
| *H01M 8/0284* | (2016.01) | |
| *H01M 8/0286* | (2016.01) | |
| *H01M 8/1004* | (2016.01) | |

(Continued)

(52) U.S. Cl.
CPC ....... *H01M 8/0273* (2013.01); *H01M 8/0202* (2013.01); *H01M 8/0284* (2013.01);
(Continued)

(58) Field of Classification Search
None
See application file for complete search history.

(56) References Cited

U.S. PATENT DOCUMENTS

| | | |
|---|---|---|
| 2016/0079082 A1 | 3/2016 | Ojima |
| 2017/0162882 A1 | 6/2017 | Kawasumi |

(Continued)

FOREIGN PATENT DOCUMENTS

| | | |
|---|---|---|
| JP | 2009-006708 A | 1/2009 |
| JP | 2013-062031 A | 4/2013 |

(Continued)

OTHER PUBLICATIONS

Ikeda et al. (JP, 2014-120249) (a raw machine translation) (Abstract) (Jun. 30, 2014) (Year: 2014).*

(Continued)

*Primary Examiner* — Carmen V Lyles-Irving
(74) *Attorney, Agent, or Firm* — Sughrue Mion, PLLC (57) ABSTRACT

An object of the present disclosure is to provide a method for manufacturing a fuel cell that ensures developing a high adhesive strength to a separator. One aspect of an embodiment is a method for manufacturing a fuel cell where a pair of separators are mutually bonded with a sealing member. The sealing member includes a thermoplastic resin containing a crystalline polymer as an adhesive layer. The method for manufacturing the fuel cell includes: preparing a stack structure in which the sealing member is disposed between the pair of separators; heating the stack structure at a melting point or higher of the thermoplastic resin; after the heating, holding the stack structure in a temperature range of ±10° C. of a crystallization temperature of the thermoplastic resin to promote a crystallization of the thermoplastic resin; and after the holding, further cooling the stack structure.

6 Claims, 6 Drawing Sheets

(51) Int. Cl.
*H01M 8/248* (2016.01)
*H01M 8/10* (2016.01)

(52) U.S. Cl.
CPC ....... *H01M 8/0286* (2013.01); *H01M 8/1004* (2013.01); *H01M 8/248* (2013.01); *H01M 8/2457* (2016.02); *H01M 2008/1095* (2013.01)

(56) References Cited

U.S. PATENT DOCUMENTS

2017/0229716 A1 8/2017 Nonoyama
2017/0229718 A1 8/2017 Taguchi et al.

FOREIGN PATENT DOCUMENTS

| | | |
|---|---|---|
| JP | 2014-120249 A | 6/2014 |
| JP | 2016-058620 A | 4/2016 |
| JP | 2017-103126 A | 6/2017 |
| JP | 2017-147235 A | 8/2017 |

OTHER PUBLICATIONS

Ikeda et al. (JP, 2014-120249) (a raw machine translation) (Detailed Description) (Jun. 30, 2014) (Year: 2014).*
Ikeda et al. (JP, 2014-120249) (a raw machine translation) (Drawings) (Jun. 30, 2014) (Year: 2014).*

* cited by examiner

High Crystallinity

Fig. 5B

Low Crystallinity

METHOD FOR MANUFACTURING FUEL CELL AND FUEL CELL

CROSS REFERENCE TO RELATED APPLICATIONS

The present application claims priority from Japanese patent application JP 2018-136820 filed on Jul. 20, 2018, the content of which is hereby incorporated by reference into this application.

BACKGROUND

Technical Field

The present disclosure relates to a method for manufacturing a fuel cell, and related to the fuel cell.

Background Art

A fuel cell of a solid polymer fuel cell device includes a Membrane Electrode Assembly (MEA), which includes an ion permeable electrolyte membrane, an anode side catalyst layer (electrode layer), and a cathode side catalyst layer (electrode layer). The electrolyte membrane is sandwiched between the anode side catalyst layer and the cathode side catalyst layer. The Membrane Electrode Assembly has both sides on which Gas Diffusion Layers (GDLs) are formed to provide fuel gas or oxidant gas and collect electricity generated through an electrochemical reaction. The Membrane Electrode Assembly having both sides on which the GDLs are disposed is referred to as a Membrane Electrode & Gas Diffusion Layer Assembly (MEGA), and the MEGA is sandwiched by a pair of separators. On an outer periphery of the MEGA between the pair of separators, a sealing member is disposed to reduce a leakage (so-called cross leakage) of a reactant gas and an electrical short between electrodes, and the sealing member bonds the pair of separators together.

For example, JP 2014-120249 A discloses a fuel cell device that includes a Membrane Electrode & Gas Diffusion Layer Assembly, a sealing member, and a pair of separators. The sealing member is disposed on an outer peripheral portion of the Membrane Electrode & Gas Diffusion Layer Assembly. The Membrane Electrode & Gas Diffusion Layer Assembly and the sealing member are sandwiched by the pair of separators. The sealing member includes a core layer made of a thermoplastic resin and a pair of skin layers. The pair of skin layers in contact with the pair of separators are formed on superficial layers on both sides of the core layer and bond the pair of separators and the core layer together. The sealing member before being sandwiched by the pair of separators has a thickness smaller than a thickness of the Membrane Electrode & Gas Diffusion Layer Assembly before being sandwiched by the pair of separators.

JP 2017-103126 A discloses a fuel cell that includes a Membrane Electrode & Gas Diffusion Layer Assembly, first and second separators, a sealing member, and a bonding portion. The Membrane Electrode & Gas Diffusion Layer Assembly includes an electrolyte membrane, a first catalyst layer, a second catalyst layer, a first gas diffusion layer, and a second gas diffusion layer. The first catalyst layer is formed on one surface of the electrolyte membrane. The second catalyst layer is formed on the other surface of the electrolyte membrane such that a peripheral edge region of the electrolyte membrane is exposed. The first gas diffusion layer is joined to the first catalyst layer. The second gas diffusion layer is joined to the second catalyst layer such that the peripheral edge region is exposed. The Membrane Electrode & Gas Diffusion Layer Assembly is sandwiched by the first and second separators. The sealing member includes a frame-shaped substrate made of resin, a first adhesive layer, and a second adhesive layer. The first adhesive layer bonds one surface of the substrate and the first separator together. The second adhesive layer bonds the other surface of the substrate and the second separator together. The bonding portion bonds an inner peripheral edge side of the one surface of the substrate and the peripheral edge region of the electrolyte membrane together. The first and second adhesive layers are separated from the bonding portion to outside of the electrolyte membrane in a planar direction of the electrolyte membrane. Any adhesive component is not disposed in the substrate, except for the bonding portion, between the inner peripheral edge of the substrate and the first and second adhesive layers in the planar direction of the electrolyte membrane. A linear expansion coefficient of the substrate is smaller than those of the first and second adhesive layers.

SUMMARY

As described above, the fuel cell is manufactured by bonding the separators together with the sealing member containing the thermoplastic resin and the like. The thermoplastic resin heated and melted and then cooled to harden develops an adhesive strength. This thermoplastic resin having the developed adhesive strength bonds the separators together to keep a sealing property of a gas flowing in a cell. However, depending on a usage environment of the fuel cell device, the separator is possibly peeled off from the sealing member and therefore the higher adhesive strength has been required.

Therefore, the present disclosure provides a method for manufacturing a fuel cell that ensures developing a high adhesive strength to a separator.

Through serious examinations, the inventors have found that after heating a thermoplastic resin at a melting point or higher, when the thermoplastic resin is held in a temperature range of $\pm 10°$ C. of a crystallization temperature to promote the crystallization, an adhesive strength of the thermoplastic resin to a separator can be improved, thus having reached an embodiment.

Aspects of the embodiment are as follows.

(1) A method for manufacturing a fuel cell where a pair of separators are mutually bonded with a sealing member. The sealing member includes a thermoplastic resin containing a crystalline polymer as an adhesive layer. The method for manufacturing a fuel cell includes: preparing a stack structure in which the sealing member is disposed between the pair of separators; heating the stack structure at a melting point or higher of the thermoplastic resin; after the heating, holding the stack structure in a temperature range of $\pm 10°$ C. of a crystallization temperature of the thermoplastic resin to promote a crystallization of the thermoplastic resin; and after the holding, further cooling the stack structure.

(2) In the method for manufacturing the fuel cell according to (1), the holding comprising holding the stack structure in the temperature range for at least one second.

(3) In the method for manufacturing the fuel cell according to (1) or (2), the holding comprising holding the stack structure in the temperature range using a first cooling press.

(4) In the method for manufacturing the fuel cell according to (3), the cooling comprising cooling the stack structure using a second cooling press.

(5) In the method for manufacturing the fuel cell according to any one of (1) to (4), the heating comprising heating the stack structure using a hot press.

(6) In the method for manufacturing the fuel cell according to any one of (1) to (5), the crystallization in the holding forms a lamellar structure derived from the crystalline polymer on an interface between the separator and the thermoplastic resin in a direction approximately perpendicular to the interface.

(7) In the method for manufacturing the fuel cell according to any one of (1) to (6), the crystalline polymer includes an olefin-based thermoplastic polymer.

(8) In the method for manufacturing the fuel cell according to any one of (1) to (7), the sealing member further includes a core layer, and the adhesive layers are disposed on both surfaces of the core layer.

(9) A fuel cell includes a Membrane Electrode Assembly, a pair of separators, and a sealing member. The Membrane Electrode Assembly includes an electrolyte membrane and catalyst electrodes disposed on both surfaces of the electrolyte membrane. Between the pair of separators, the Membrane Electrode Assembly is sandwiched. The sealing member bonds the pair of separators together. The sealing member includes a thermoplastic resin containing a crystalline polymer as an adhesive layer. A lamellar structure derived from the crystalline polymer is formed on an interface between the thermoplastic resin and the separator in a direction approximately perpendicular to the interface.

(10) In the fuel cell according to (9), the crystalline polymer includes an olefin-based crystalline polymer.

(11) In the fuel cell according to (9) or (10), the sealing member further includes a core layer. The adhesive layers are disposed on both surfaces of the core layer.

The present disclosure allows providing the method for manufacturing the fuel cell that ensures developing a high adhesive strength to the separator.

DETAILED DESCRIPTION

An embodiment is a method for manufacturing a fuel cell where a pair of separators are mutually bonded with a sealing member. The sealing member includes a thermoplastic resin containing a crystalline polymer as an adhesive layer. The method for manufacturing the fuel cell includes: a preparation step of preparing a stack structure in which the sealing member is disposed between the pair of separators; a heating step of heating the stack structure at a melting point or higher of the thermoplastic resin; after the heating step, a first cooling step of holding the stack structure in a temperature range of ±10° C. of a crystallization temperature of the thermoplastic resin to promote a crystallization of the thermoplastic resin; and after the first cooling step, a second cooling step of further cooling the stack structure.

The embodiment uses the thermoplastic resin containing the crystalline polymer as a material (namely, an adhesive) bonding the separators together. After the heating step melts the thermoplastic resin and wets the separator surfaces with the thermoplastic resin, the stack structure is held in the temperature range of ±10° C. of the crystallization temperature of the thermoplastic resin to promote the crystallization of the thermoplastic resin (first cooling step). While the first cooling step cools the thermoplastic resin from the melted state, at the time, holding the stack structure in the temperature range of ±10° C. of the crystallization temperature of the thermoplastic resin promotes the crystallization. After the first cooling step, the thermoplastic resin is further cooled (second cooling step) to be completely hardened. In the embodiment, the first cooling step promotes the crystallization of the thermoplastic resin to ensure improving a bonding strength between the thermoplastic resin as the adhesive layer and the separator.

Figure 5A:
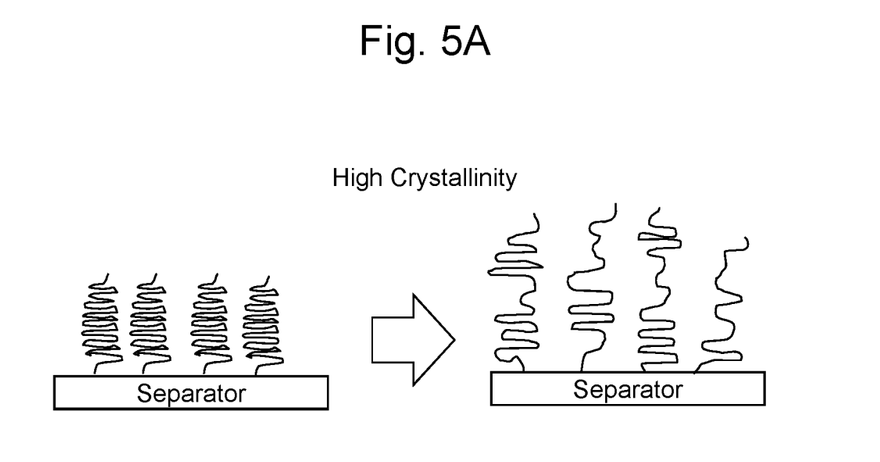
FIG. 5A is a schematic diagram schematically describing a reason why a bonding strength increases at a high crystallinity.
Figure 5B:
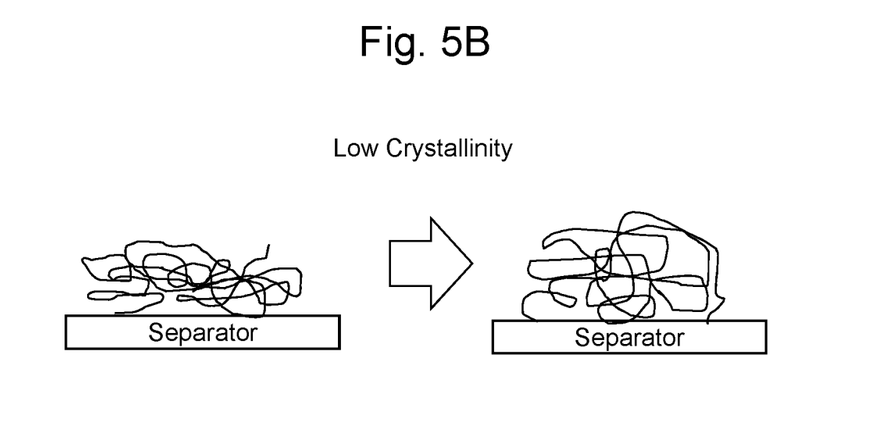
FIG. 5B is a schematic diagram schematically describing the reason why the bonding strength increases at the high crystallinity continuous from FIG. 5A.

The following theory is given as a presumption why the bonding strength increases at the high crystallinity (a degree of the crystallization). As illustrated in FIG. 5A, at the high crystallinity, a crystalline structure (lamellar structure) in which polymer chains are folded are present much in the thermoplastic resin; therefore, increased portions of these crystalline structures are bonded to the separator. When the separator is peeled off in this state, the foldings of the crystalline structures are extended and broken. At this time, much energy is required to extend the polymer. Consequently, the bonding strength increases. Meanwhile, as illustrated in FIG. 5B, at a low crystallinity, amorphous structures where the structures are not dense bond to the separator. When the separator is peeled off in this state, the energy required for the extension is smaller than that in the crystalline structure. Based on the above-described reason, it is presumed that the high crystallinity increases the bonding strength. Note that these presumptions do not limit the present disclosure.

As described above, the embodiment can provide the method for manufacturing the fuel cell that ensures exhibiting the high adhesive strength to the separator.

Note that all of the crystallization temperature, the melting point and a glass-transition temperature in this specification can be obtained by differential scanning calorimetry (DSC). Usually, a glass transition involves an increase in the amorphous structures. Such transition appears as a peak in a base line of the DSC curve. This occurs because of a change in thermal capacity in a sample. A viscosity of the amorphous structure decreases in association with the increase in temperature, and the temperature reaches a certain point (crystallization temperature) sufficient for molecules to crystallize. The transition from the amorphous structure to the crystalline structure produces an exothermic reaction, and the crystallization temperature appears as a peak of a ridge line. Further increase in temperature finally reaches the melting point appearing as an absorption of heat (a peak of a trough line). A thermal analysis by the DSC is performed under a condition where, for example, the temperature is raised at 30° ° C./minute, the melting point peak is measured (melting temperature), and after that the temperature is decreased at 100° C./minute, thus measuring a recrystallization point (crystallization temperature).

The following describes components of the embodiment in further detail.

[Sealing Member]

The sealing member is a member to prevent a cross leakage and an electrical short between electrodes and bonds the separators together. The sealing member includes the thermoplastic resin containing the crystalline polymer as the adhesive layer. The thermoplastic resin functions as an adhesive bonded to the surface of the separator.

In the embodiment, the thermoplastic resin contains the crystalline polymer as the main component and may contain various additives (for example, an antioxidant, a tackifier, a softener, a processing aid, and a wax) in addition to the crystalline polymer. One kind of the additive may be used alone, or two kinds or more of the additives may be used in combination. Insofar as the effects of the embodiment are not impaired, a resin other than the crystalline polymer (for example, amorphous thermoplastic polymer and thermosetting polymer) may be contained.

Note that "contains the crystalline polymer as the main component" means that the crystalline polymer is contained by the highest content among the components contained in the thermoplastic resin, and the content of the crystalline polymer in the thermoplastic resin is 50 weight % or more in some embodiments.

In the embodiment, the crystalline polymer is thermoplastic and is also referred to as crystalline thermoplastic polymer. An example of the crystalline polymer includes an olefin-based thermoplastic polymer or an acrylic-based thermoplastic polymer. Among these polymers, since the olefin-based thermoplastic polymer ensures securing the adhesiveness in a short time and is excellent in productivity of the fuel cell devices, the olefin-based thermoplastic polymer is used in some embodiments. As the olefin-based thermoplastic polymer, for example, a propylene-based polymer containing propylene as the main polymerization component such as polypropylene, polyethylene, cyclic olefin, and polymethylpentene can be exemplified. From aspects of the process temperature and the bonding strength, the olefin-based thermoplastic polymer contains the propylene-based polymer as the main component in some embodiments. Note that "contain the propylene-based polymer as the main component" means that the content of the propylene-based polymer is the largest in the olefin-based thermoplastic polymer, and the content of the propylene-based polymer in the olefin-based thermoplastic polymer is 50 mass % or more in some embodiments. One kind of the crystalline polymer may be used alone, or two kinds or more of the crystalline polymers may be used in combination. From an aspect of the adhesiveness, the crystalline polymer contains —OH groups or —COOH groups in side chains in some embodiments. The —OH group or the —COOH group can function as an adhesive functional group.

The crystalline polymer (for example, the olefin-based thermoplastic polymer or the acrylic-based thermoplastic polymer) may be denatured with acid. For example, the olefin-based thermoplastic polymer denatured with the acid are excellent in wettability to surfaces of metals, resins or the like as materials of the separator, thus featuring the high adhesiveness. For example, unsaturated carboxylic acid or its derivative or the like can be exemplified as the acid. One kind of the acid may be used alone or two kinds or more of the acids may be used in combination. The unsaturated carboxylic acid or its derivative includes, for example, the unsaturated carboxylic acid such as maleic acid, fumaric acid, acrylic acid, methacrylic acid, tetrahydrophthalic acid, itaconic acid, citraconic acid, crotonic acid, and isocrotonic acid, and acid anhydride such as maleic anhydride, itaconic acid anhydride, citraconic anhydride, malonyl chloride, maleimide, monomethyl maleate, dimethyl maleate, and glycidyl maleate.

An organic component contained in the thermoplastic resin may be the crystalline polymer alone or may contain one kind or two kinds or more of materials other than the crystalline polymer, for example, a polymer other than the crystalline polymer, rubber, or elastomer as an accessory component as necessary.

As the polymer other than the crystalline polymer, the rubber, and the elastomer, which are any given accessory components, for example, a nylon-based polymer, ethylene-propylene rubber, polybutadiene, and isoprene can be exemplified. One kind of these substances may be used alone or two kinds or more of the substances may be used in combination.

Insofar as the thermoplastic resin is contained as the adhesive layer, the configuration of the sealing member is not especially limited. In one embodiment, the sealing member, for example, is formed of one layer of the thermoplastic resin alone. In one embodiment, the sealing member, for example, further includes a core layer in addition to the adhesive layers, and the adhesive layers are disposed on both surfaces of the core layer.

The core layer is made of a material that defines a structure serving as a base of the sealing member. The core layer has a tensile strength higher than that of the adhesive layer in some embodiments. The core layer is harder than the adhesive layer in some embodiments. The core layer has a melting point higher than that of the adhesive layer in some embodiments. The core layer does not melt in the heating step in some embodiments.

The core layer can be constituted using various kinds of materials, such as the thermoplastic resin or thermosetting resin. The thermoplastic resin usable for the core layer includes, for example, polyethylene naphthalate (PEN) and polypropylene (PP). The material of the core layer may be identical to or may be different from the material of the adhesive layer.

[Preparation Step]

The manufacturing method according to the embodiment includes the preparation step of preparing the stack structure in which the sealing member is disposed between the pair of separators. Since the thermoplastic resin is the adhesive layer, the sealing member is disposed such that the thermoplastic resin faces the separators.

While examples of the separator include separators made of metal such as stainless steel and titanium and made of resin, the separator is not especially limited to these separators.

[Heating Step]

The manufacturing method according to the embodiment includes the heating step that heats the stack structure at the melting point or higher of the thermoplastic resin after the preparation step.

The heating melts the thermoplastic resin, thus wetting the separator surface with the thermoplastic resin.

While heating means is not especially limited, a hot press is used in some embodiments. The use of the hot press allows heating while the separators and the adhesive layers are press-bonded. The hot press in this specification means a press used for heating that can control the temperature. Meanwhile, a cooling press means a press used for cooling that can control the temperature. The actual configurations of the hot press and the cooling press are basically identical.

Insofar as the heating temperature is the melting point or higher of the thermoplastic resin, the heating temperature is not especially limited. Although depending on the kind of the thermoplastic resin, the heating temperature is, for example, in a range of 120 to 180° C. From an aspect of sufficient dissolution, the heating temperature is the melting point of the thermoplastic resin+10° C. or more in some embodiments. From an aspect of avoiding decomposition and the like of the resin, the heating temperature is the melting point of the thermoplastic resin+30° C. or less in some embodiments.

Insofar as the thermoplastic resin is dissolved, the heating period is not especially limited. The heating period is, for example, three seconds or more. The heating period is five seconds or more and 30 seconds or less in some embodiments.

[First Cooling Step]

The manufacturing method according to the embodiment includes the first cooling step after the heating step. The first cooling step holds the stack structure in the temperature range of ±10° C. of the crystallization temperature of the thermoplastic resin to promote the crystallization of the thermoplastic resin.

Holding the stack structure in the temperature range of 10° C. of the crystallization temperature of the thermoplastic resin in the first cooling step allows promoting the crystallization of the thermoplastic resin. Because of the above-described reason, the increase in crystallinity of the thermoplastic resin increases the energy required to peel off the separator; therefore, the bonding strength is improved.

The crystallization in the first cooling step forms the lamellar structure derived from the crystalline polymer on an interface between the separator and the thermoplastic resin in a direction approximately perpendicular to the interface in some embodiments. The lamellar structure arrayed on the interface increase the bonding strength. It is presumed that this occurs because arraying the lamellar structure on the interface increases bonding points to the separator. Note that this presumption does not limit the present disclosure. The lamellar structure derived from the crystalline polymer formed perpendicular to the interface are formed in a range of 40% or more relative to the interface having a constant length (for example, 200 to 1000 nm) in cross-sectional surfaces of the separator and the thermoplastic resin (for example, a TEM cross-sectional image) in some embodiments, formed in a range of 50% or more in some embodiments, and formed in a range of 60% or more in some embodiments. The formation proportion of the lamellar structure relative to the interface can be calculated as an average of the formation proportions in the plurality of cross-sectional surfaces (for example, three or more, and five or more in some embodiments). Specifically, for example, the formation proportion (the average in the three cross-sectional surfaces) of the lamellar structure relative to the interface having the constant length (250 nm) in the TEM cross-sectional images of the separator and the thermoplastic resin is 40% or more (100 nm or more). The lamellar structure can be observed as stripes indicative by TEM. Therefore, when the stripes showing the lamellar structure are formed in a direction approximately perpendicular to the interface in a TEM cross-sectional image perpendicular to the plane direction of the stack structure, the lamellar structure is formed in a direction approximately perpendicular to the interface.

The first cooling step holds the stack structure in the temperature range using the cooling press in some embodiments. The use of the cooling press allows the cooling while the separators and the sealing member are press-bonded and further allows efficiently holding the sealing member in the predetermined temperature range.

The first cooling step holds the stack structure in the temperature range for at least one second in some embodiments, and holds the stack structure in the temperature range for at least three seconds in some embodiments. The cooling period is one second or more in some embodiments, three seconds or more in some embodiments, five seconds or more in some embodiments, and ten seconds or more in some embodiments. The cooling period of one second or more allows further effectively promoting the crystallization. The cooling period is 60 seconds or less in some embodiments, 40 seconds or less in some embodiments, and 20 seconds or less in some embodiments. The cooling period of 60 seconds or less ensures shortening a period required for the step.

The first cooling step holds the stack structure in the temperature range of ±5° C. of the crystallization temperature of the thermoplastic resin in some embodiments.

[Second Cooling Step]

The manufacturing method according to the embodiment includes the second cooling step that further cools the stack structure after the first cooling step. The second cooling step completely hardens the thermoplastic resin and decreases the temperature of the stack structure down to a temperature at which a production worker can grip the stack structure by the hand.

The second cooling step uses the cooling press in some embodiments. The use of the cooling press allows the cooling while the separators and the sealing member are press-bonded and further allows efficiently cooling the sealing member. The second cooling step can simply leave the stack structure (for example, the stack structure is left under a room temperature environment).

While the cooling period in the second cooling step is not especially limited, the cooling period is three seconds or more in some embodiments, five seconds or more in some embodiments, and ten seconds or more in some embodiments. The cooling period is 60 seconds or less in some embodiments, 40 seconds or less in some embodiments, and 20 seconds or less in some embodiments.

While the cooling temperature in the second cooling step is not especially limited, for example, the cooling temperature is 60° C. or less, in a temperature range of 10 to 60° C. in some embodiments, and in a temperature range of 20 to 50° C. in some embodiments.

[Fuel Cell]

The following describes the specific embodiment of the fuel cell with reference to the drawings.

Figure 1:
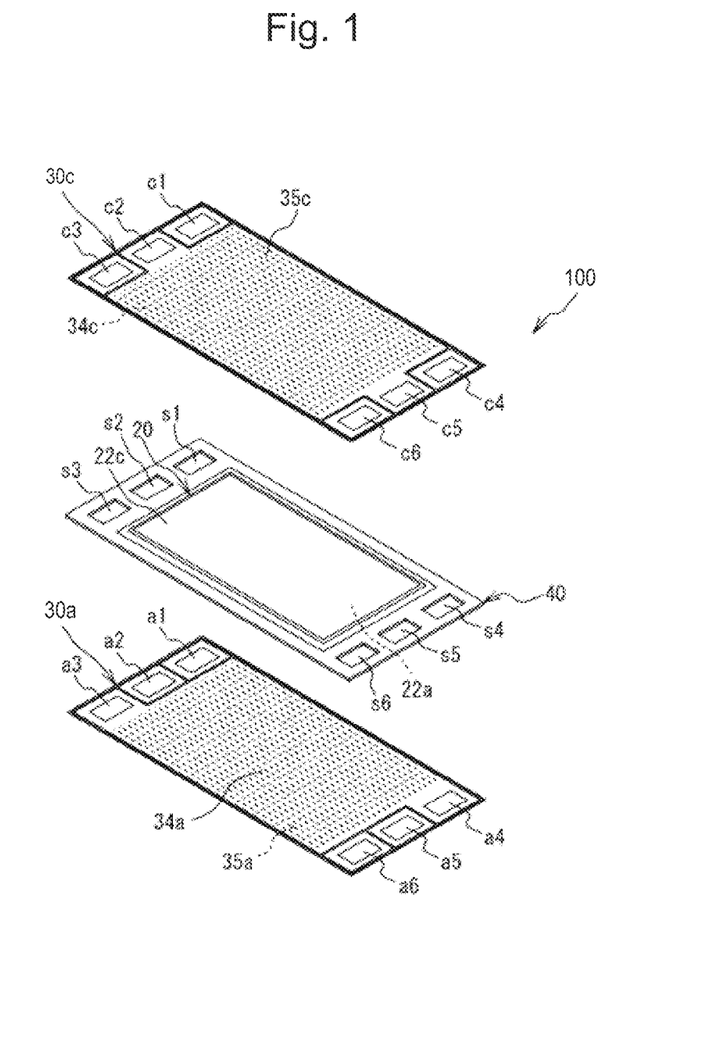
FIG. 1 is an exploded perspective view of a single cell 100 as a fuel cell according to an embodiment.

FIG. 1 is an exploded perspective view of a single cell 100, which is a fuel cell. Fuel cell devices are structured by stacking the plurality of single cells 100. This fuel cell device is a solid polymer fuel cell to which fuel gas (for example, hydrogen) and oxidant gas (for example, oxygen) are supplied as reactant gas to generate electricity. The single cell 100 includes a Membrane Electrode & Gas Diffusion Layer Assembly (MEGA) 20, and an anode side separator 30a and a cathode side separator 30c (hereinafter referred to as separators) between which the MEGA 20 is sandwiched. The MEGA 20 has an anode side gas diffusion layer 22a and a cathode side gas diffusion layer 22c (hereinafter referred to as diffusion layers). An approximately frame-shaped and insulating sealing member 40, details of which will be given later, is provided in a peripheral edge region of the MEGA 20.

Holes a1 to a3 are formed on one side of two short sides of the anode side separator 30a and holes a4 to a6 are formed on the other side. Similarly, holes c1 to c3 are formed on one side of two short sides of the cathode side separator 30c, and holes c4 to c6 are formed on the other side. Holes s1 to s3 are formed on one side of two short sides of the sealing member 40, and holes s4 to s6 are formed on the other side. The holes a1, s1, and c1 communicate with one another and define a cathode inlet manifold. Similarly, the holes a2, s2, and c2 define a refrigerant outlet manifold, the holes a3, s3, and c3 define an anode outlet manifold, the holes a4, s4, and c4 define an anode inlet manifold, the holes a5, s5, and c5 define a refrigerant inlet manifold, and the holes a6, s6, and c6 define a cathode outlet manifold.

On a surface of the anode side separator 30a opposed to the MEGA 20, the anode inlet manifold and the anode outlet manifold communicate with one another, thus forming an anode flow passage 34a where the fuel gas flows. On a surface of the cathode side separator 30c opposed to the MEGA 20, the cathode inlet manifold and the cathode outlet manifold communicate with one another, thus forming a cathode flow passage 34c where the oxidant gas flows. On the surface of the anode side separator 30a on the side opposite to the anode flow passage 34a and the surface of the cathode side separator 30c on the side opposite to the cathode flow passage 34c, the refrigerant inlet manifold and the refrigerant outlet manifold communicate with one another, thus forming refrigerant flow passages 35a and 35c, respectively, where refrigerant flows.

Figure 2:
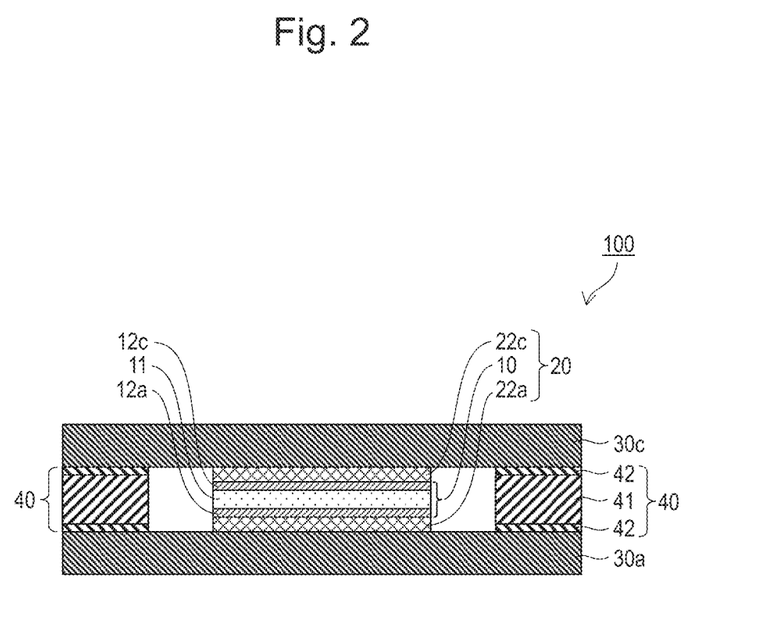
FIG. 2 is a cross-sectional schematic diagram illustrating a schematic configuration of the fuel cell according to the embodiment.

Next, FIG. 2 is a cross-sectional schematic diagram illustrating a schematic configuration of the fuel cell. This fuel cell 100 is a solid polymer fuel cell device to which fuel gas (for example, hydrogen) and oxidant gas (for example, oxygen) are supplied as reactant gas to generate electricity. The fuel cell device usually has a stacked structure in which the plurality of fuel cells 100 are stacked.

The fuel cell 100 includes the Membrane Electrode & Gas Diffusion Layer Assembly (MEGA) 20, the sealing member 40, the anode side separator 30a, and the cathode side separator 30c. The MEGA 20 includes a Membrane Electrode Assembly (MEA) 10 having the one surface on which the anode side gas diffusion layer 22a is disposed and the other surface on which the cathode side gas diffusion layer 22c is disposed. The sealing member 40 is disposed on the outer peripheral portion of the MEGA 20. The MEGA 20 and the sealing member 40 are sandwiched by the anode side separator 30a and the cathode side separator 30c. When not being especially discriminated, the anode side separator 30a and the cathode side separator 30c are also simply referred to as "separators 30."

The MEA 10 is an electricity generating body that includes an anode side catalyst layer 12a and a cathode side catalyst layer 12c to which catalysts to promote a fuel cell reaction are supported on both surfaces of an electrolyte membrane 11. The electrolyte membrane 11 is a solid polymer thin membrane exhibiting satisfactory proton conductivity in a wetting state. The electrolyte membrane 11 can be formed of a fluorine-based ion exchange membrane such as Nafion (registered trademark). The anode side catalyst layer 12a and the cathode side catalyst layer 12c, for example, can be formed by applying a catalyst ink containing a carbon carrier carrying, for example, platinum (Pt) and ionomer having proton conductivity over the electrolyte membrane 11.

The MEGA 20 includes the anode side gas diffusion layer 22a on the side of the surface of the MEA 10 where the anode side catalyst layer 12a is disposed and the cathode side gas diffusion layer 22c on the side of the surface of the MEA 10 where the cathode side catalyst layer 12c is disposed. The anode side gas diffusion layer 22a and the cathode side gas diffusion layer 22c are made of materials having gas permeability and a conductive property. As the materials, for example, a carbon paper, a carbon cloth, and a paper made of stainless steel fiber are usable.

The MEGA 20 and the sealing member 40 are sandwiched by the pair of separators 30. As the separator 30, a member having a gas cut-off property and electron conductivity is usable. In one embodiment, the separator 30 is made of press-formed stainless steel. The separator 30 can also be formed with, for example, a thin plate-shaped member made of metal such as titanium, a titanium alloy, and stainless steel, and a member made of carbon such as dense carbon.

The sealing member 40 is a member to prevent the cross leakage and the electrical short between the electrodes. In one embodiment, the sealing member 40 has a three-layer structure including adhesive layers 42 on both surfaces of a core layer 41.

The core layer 41 is made of a material that defines a structure serving as a base of the sealing member 40. At a temperature where the sealing member 40 is exposed under a usage environment of the fuel cell device and a cell formation temperature (a temperature at which the fuel cells are formed), an amount of deformation of the core layer 41 when a constant load is applied is smaller than that of the adhesive layer 42 in some embodiments. Accordingly, the core layer has the tensile strength higher than that of the adhesive layer in some embodiments. To bond the core layer 41 and the separator 30 together and secure the sealing property, the adhesive layer 42 has a property of high adhesiveness. The adhesive layer 42 has a melting point lower than that of the core layer 41 in some embodiments.

The core layer 41 can be constituted using various kinds of materials such as the thermoplastic resin or the thermosetting resin. The thermoplastic resin usable for the core layer 41 includes, for example, the polyethylene naphthalate (PEN) and the polypropylene (PP). The core layer 41 is harder than the two adhesive layers 42 in some embodiments and specifically harder than the adhesive layers 42 at the cell formation temperature in some embodiments.

As the adhesive layer 42, the thermoplastic resin containing the crystalline polymer is used.

Although the illustration is omitted in the drawing, a fuel gas flow passage and an oxidant gas flow passage are formed between the anode side gas diffusion layer 22a and the anode side separator 30a, and between the cathode side gas diffusion layer 22c and the cathode side separator 30c, respectively. The fuel gas flow passage is, for example, a flow passage for hydrogen gas, and the oxidant gas flow passage is, for example, a flow passage for oxygen gas.

FIGS. 3A to 3D are schematic cross-sectional step views describing the step example of the method for manufacturing the fuel cell according to the embodiment.

Figure 3A:
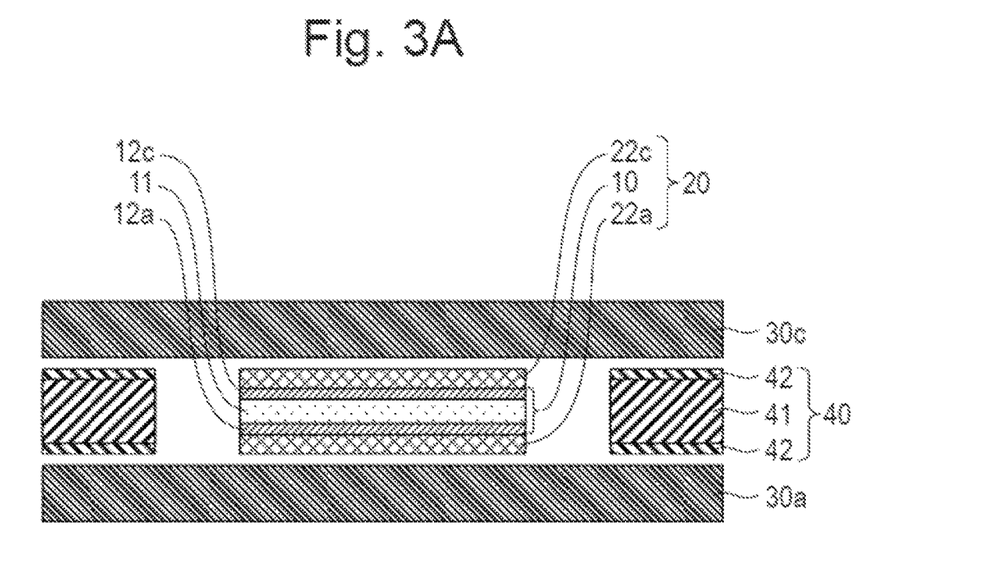
FIG. 3A is a schematic cross-sectional step view describing a step example of the method for manufacturing the fuel cell according to the embodiment.

First, as illustrated in FIG. 3A, the stack structure including the MEGA 20, the sealing member 40, the anode side separator 30a, and the cathode side separator 30c is prepared (preparation step). The MEGA 20 includes, for example, the cathode side gas diffusion layer 22c on the surface of the cathode side catalyst layer 12c of the MEA 10 and includes the anode side gas diffusion layer 22a on the surface of the anode side catalyst layer 12a. The sealing member 40 includes the core layer 41 and the two adhesive layers 42. The sealing member 40 is disposed between the pair of separators 30 and on the outer periphery of the MEGA 20.

Figure 3B:
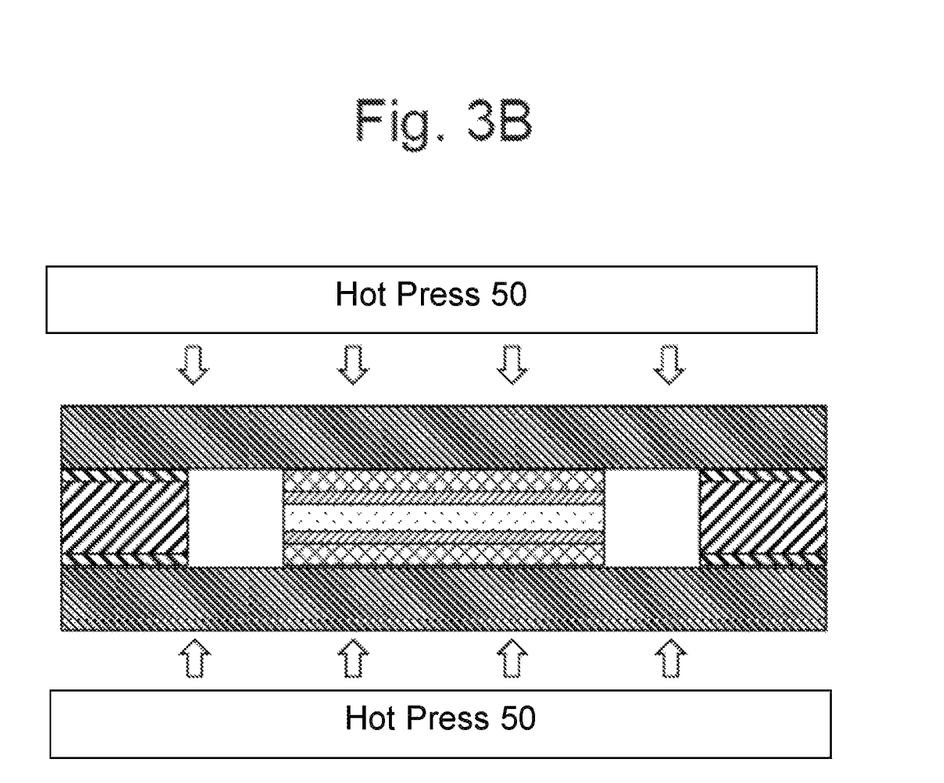
FIG. 3B is a schematic cross-sectional step view describing the step example of the method for manufacturing the fuel cell according to the embodiment continuous from FIG. 3A.

Next, as illustrated in FIG. 3B, thermocompression bonding is mutually performed on the separators 30 using the hot press 50.

The hot press includes a pair of pressing portions. A temperature of the pressing portions is controlled to be the melting point or higher of the thermoplastic resin by a temperature controller. The stack structure is placed on one pressing portion, and the stack structure is pressed from the above by the other pressing portion. At this time, the separators 30 are pressed into the sealing member 40 at a pressure to the extent of not excessively deforming the core layer 41. This hot press melts the thermoplastic resin, and the thermoplastic resin wets the separator surfaces.

The heating temperature is the melting point or higher of the thermoplastic resin, and is, for example, in a range of 120 to 180° C.

A holding period (hot press period) in the heating step is, for example, three seconds or more, five seconds or more in some embodiments, and ten seconds or more in some embodiments. The holding period is, for example, 60 seconds or less and 30 seconds or less in some embodiments.

Figure 3C:
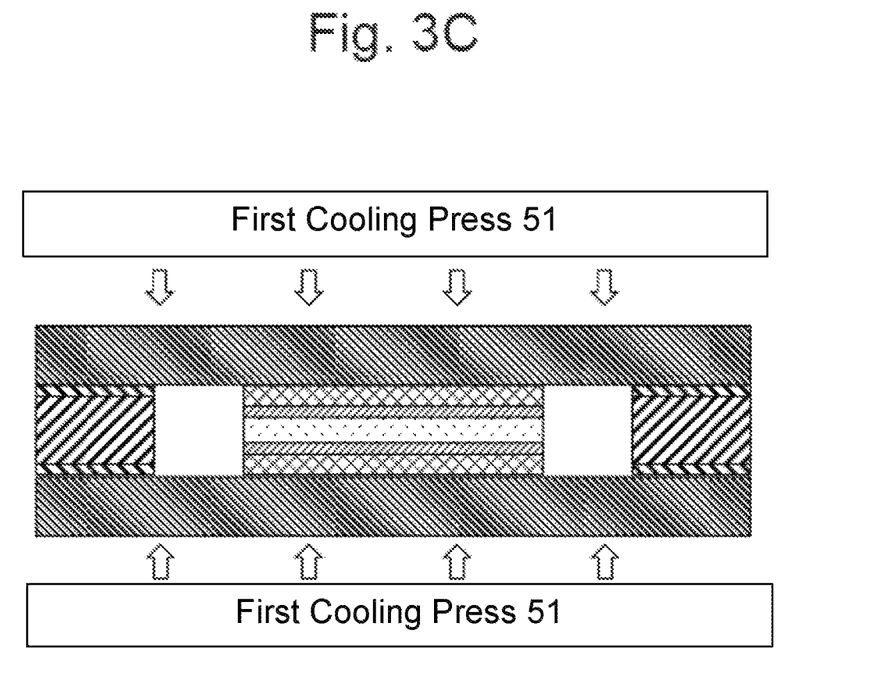
FIG. 3C is a schematic cross-sectional step view describing the step example of the method for manufacturing the fuel cell according to the embodiment continuous from FIG. 3B.

Next, as illustrated in FIG. 3C, while the separators 30 and the sealing member 40 are press-bonded using a first cooling press 51, the stack structure is held in the temperature range of ±10° C. of the crystallization temperature of the thermoplastic resin (first cooling step). This first cooling step promotes the crystallization of the thermoplastic resin. The use of the cooling press allows the cooling while the separators and the sealing member are press-bonded, and further allows efficiently holding the sealing member in the predetermined temperature range.

The cooling press includes a pair of pressing portions. A temperature of the pressing portions is controlled in the temperature range of ±10° C. of the crystallization temperature of the thermoplastic resin by the temperature controller. The stack structure is placed on one pressing portion, and the stack structure is pressed by the other pressing portion. At this time, the separators 30 are pressed into the sealing member 40 at a pressure to the extent of not excessively deforming the core layer 41. This cooling press cools the thermoplastic resin, thus promoting the crystallization.

A holding period (cooling press period) in the first cooling step is one second or more in some embodiments, three seconds or more in some embodiments, five seconds or more in some embodiments, and ten seconds or more in some embodiments. The holding period is 60 seconds or less in some embodiments, 40 seconds or less in some embodiments, and 20 seconds or less in some embodiments.

The holding temperature (cooling press temperature) in the first cooling step is in the temperature range of 10° C. of the crystallization temperature of the thermoplastic resin and a temperature range of ±5° C. of the crystallization temperature of the thermoplastic resin in some embodiments.

In one embodiment, the crystallization in the first cooling step forms the lamellar structure derived from the crystalline polymer on the interface between the separator and the thermoplastic resin in the direction approximately perpendicular to the interface. Since the lamellar structure is arrayed on the interface in some embodiments, the bonding strength is enhanced.

Figure 3D:
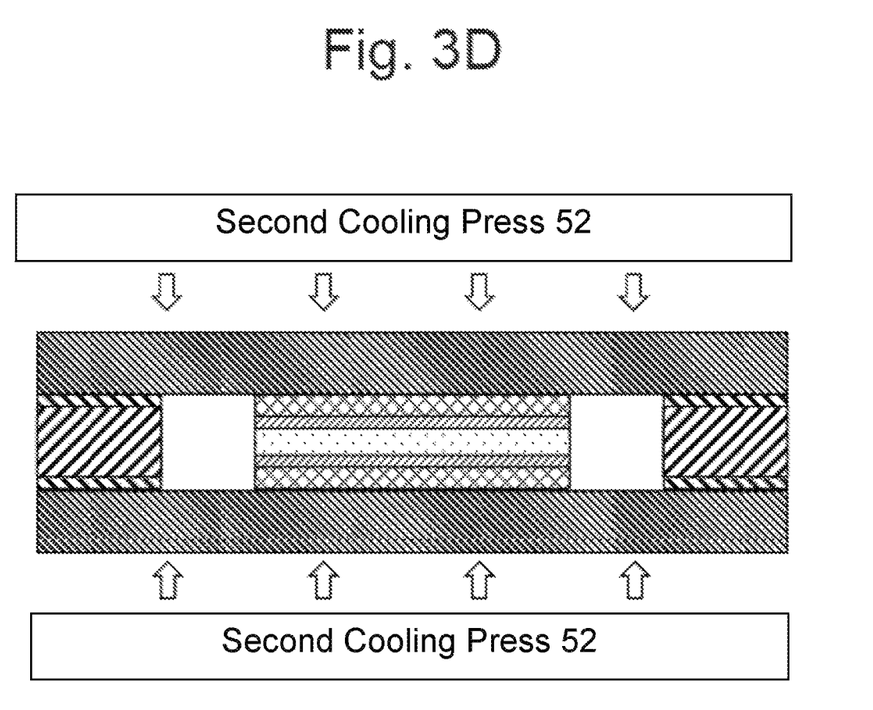
FIG. 3D is a schematic cross-sectional step view describing the step example of the method for manufacturing the fuel cell according to the embodiment continuous from FIG. 3C.

Next, as illustrated in FIG. 3D, while the separators 30 and the sealing member 40 are press-bonded using a second cooling press 52, the stack structure is further cooled (second cooling step). This second cooling step completely hardens the thermoplastic resin. The use of the cooling press allows the cooling while the separators and the sealing member are press-bonded and further allows efficiently decreasing the temperature of the sealing member.

A holding period (cooling press period) in the second cooling step is three seconds or more in some embodiments, five seconds or more in some embodiments, and ten seconds or more in some embodiments. The holding period is 60 seconds or less in some embodiments, 40 seconds or less in some embodiments, and 20 seconds or less in some embodiments.

The holding temperature (cooling press temperature) in the second cooling step is, for example, 60° C. or less, in the temperature range of 10 to 60° C. in some embodiments, and in a temperature range of 20 to 50° C. in some embodiments.

The fuel cell can be manufactured through the above-described steps.

Further, the fuel cell devices (fuel cell stack) are manufactured through steps such as bonding gaskets to the separators 30 and stacking the plurality of cells after the second cooling step.

Needless to say, the present disclosure is not limited by the above-described embodiment by any means, and can be embodied in various kinds of aspects as long as the various kinds of aspects belong to the technical scope of the present disclosure.

EXAMPLES

Although the following examples describe the embodiment in further detail, the embodiment is not limited to the following examples.

Example 1

A sealing member formed of one layer made of a thermoplastic resin (containing an olefin-based thermoplastic polymer (polypropylene) as the main component) was prepared. Measurements of a crystallization temperature and a melting point of the thermoplastic resin by DSC obtained the crystallization temperature of 105° C. and the melting point of 140° C.

Next, a T-peel test was conducted on the sealing member and a bonding strength was measured. The bonding strength was measured in the T-peel test as follows.

First, strip-shaped titanium plates (width: 10 mm) were prepared, and surfaces of the titanium plates were defatted.

Next, the sealing member was disposed between the pair of titanium plates to prepare a stack structure.

Next, using a hot press including a pair of pressing portions with the temperature set to 140° C., the stack structure was heated for ten seconds while pressed with the pressing portions (heating step).

Next, using a first cooling press including a pair of pressing portions with the temperature set to 100° C., the stack structure was cooled for five seconds while pressed with the pressing portions (first cooling step).

Next, using a second cooling press including a pair of pressing portions with the temperature set to 60° C., the stack structure was cooled for five seconds while pressed with the pressing portions (second cooling step).

Thus, a sample E1 provided for the T-peel test was manufactured.

Next, end portions of the pair of titanium plates in the sample E1 were installed to respective two gripping tools on a tensile tester. Next, the stack structure installed to the gripping tools was disposed in warm water (95° C.). The respective two gripping tools were pulled in directions opposite to one another to peel the titanium plates from the sealing member, and a bonding strength (T peel strength) of the sample E1 was determined.

Example 2

Except that the temperature of the pressing portions of the hot press was set to 160° C., a sample E2 was manufactured in the same manner as in Example 1. Moreover, a bonding strength of the sample E2 was determined in the same manner as in Example 1.

Comparative Example 11

Except that the second cooling step was performed after the heating step without the first cooling step, a sample C1 was manufactured in the same manner as in Example 1. Moreover, a bonding strength of the sample C1 was determined in the same manner as in Example 1.

Comparative Example 2

Except that the second cooling step was performed after the heating step without the first cooling step, a sample C2 was manufactured in the same manner as in Example 2. Moreover, a bonding strength of the sample C2 was determined in the same manner as in Example 1.

[Results]

Table 1 shows the results (relative values) of the bonding strengths of the samples E1, E2, and C2 with the bonding strength of the sample C1 defined as the reference (1.00).

TABLE 1

| | Sample | Heating step (Heating temperature) | First cooling step (Cooling temperature) | Second cooling step (Cooling temperature) | Bonding strength |
|---|---|---|---|---|---|
| Example 1 | E1 | Performed (140° C.) | Performed (100° C.) | Performed (60° C.) | 1.68 |
| Example 2 | E2 | Performed (160° C.) | Performed (100° C.) | Performed (60° C.) | 1.82 |
| Comparative Example 1 | C1 | Performed (140° C.) | Not performed | Performed (60° C.) | 1.00 |
| Comparative Example 2 | C2 | Performed (160° C.) | Not performed | Performed (60° C.) | 1.14 |

"Performed" suggests the execution of the step, and
"Not performed" suggests non-execution of the step.

It is seen from Table 1 that Examples 1 and 2 obtained the high bonding strengths.

Figure 4A:
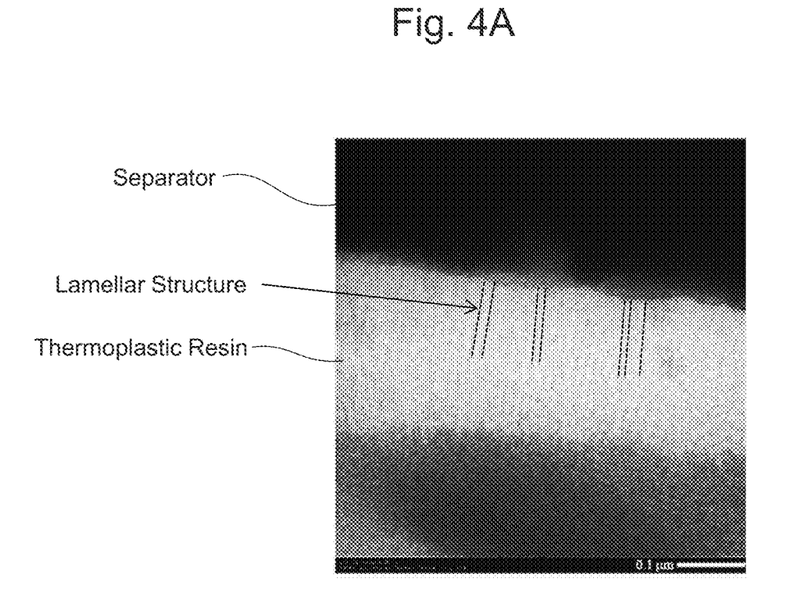
FIG. 4A is a cross-sectional TEM image of a sample E1 manufactured in Example 1.
Figure 4B:
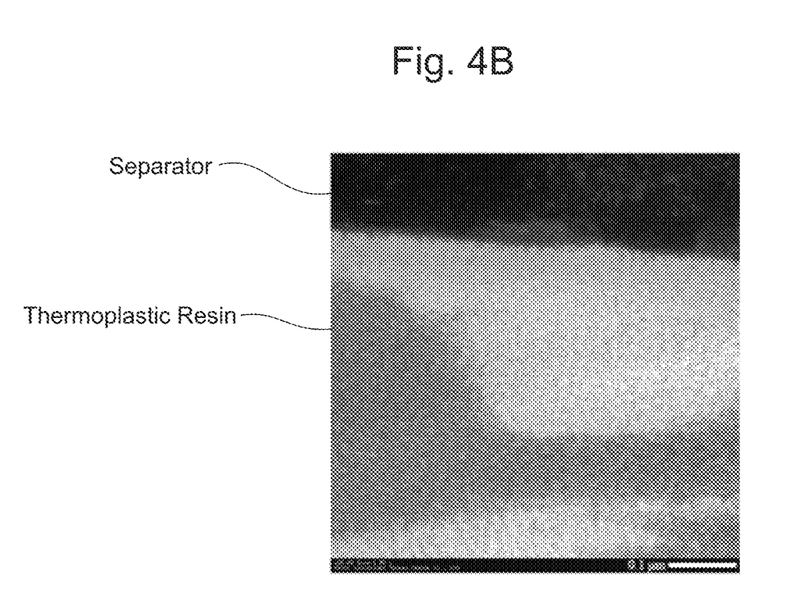
FIG. 4B is a cross-sectional TEM image of a sample C1 manufactured in Comparative Example 1.

FIG. 4A (sample E1) and FIG. 4B (sample C1) illustrate cross-sectional TEM images on which the vicinities of the titanium plates with the adhesive layers of the sample E1 and the sample C1 were photographed by TEM. It can be confirmed from the TEM image (sample E1) of FIG. 4A that stripes indicative of lamellar structure are formed on an interface. Meanwhile, the stripes indicative of the lamellar structure were not confirmed on an interface in the TEM image (sample C1) of FIG. 4B.

While the embodiment has been described in detail, the specific configuration is not limited to the embodiment. Design changes within a scope not departing from the gist of the present disclosure are included in the present disclosure.

DESCRIPTION OF SYMBOLS a1 to 6 Hole
c1 to 6 Hole
s1 to 6 Hole
10 Membrane Electrode Assembly (MEA)
11 Electrolyte membrane
12a Anode side catalyst layer
12c Cathode side catalyst layer
20 Membrane Electrode & Gas Diffusion Layer Assembly (MEGA)
22a Anode side gas diffusion layer
22c Cathode side gas diffusion layer
30a Anode side separator
30c Cathode side separator
34a Anode flow passage
34c Cathode flow passage
35a Refrigerant flow passage
35c Refrigerant flow passage
40 Sealing member
41 Core layer
42 Adhesive layer
50 Hot Press
51 First Cooling Press
52 Second Cooling Press
100 Fuel cell (single cell)

What is claimed is:

1. A method for manufacturing a fuel cell comprising a membrane electrode assembly, a pair of separators mutually bonded with a sealing member, the sealing member including a core layer and adhesive layers disposed on both surfaces of the core layer, and the adhesive layers including a thermoplastic resin containing a crystalline polymer, the method for manufacturing the fuel cell comprising:

preparing a stack structure in which the sealing member is disposed between the pair of separators;
heating the stack structure at a melting point or higher of the thermoplastic resin using a hot press;
after the heating, holding the stack structure in a temperature range of ±10° C. of a crystallization temperature of the thermoplastic resin to crystallize the thermoplastic resin using a first cooling press; and after the holding, further cooling the stack structure,
wherein the hot press includes a pair of pressing portions and a temperature of the pressing portions is controlled to be the melting point or higher of the thermoplastic resin, and
the cooling press includes a pair of pressing portions and a temperature of the pressing portions is controlled to be in the temperature range of ±10° C. of the crystallization temperature of the thermoplastic resin.

2. The method for manufacturing the fuel cell according to claim 1,
wherein the holding comprises holding the stack structure in the temperature range for at least one second.

3. The method for manufacturing the fuel cell according to claim 1,
wherein the cooling comprising cooling the stack structure using a second cooling press.

4. The method for manufacturing the fuel cell according to claim 1,
wherein the crystallization in the holding forms a lamellar structure derived from the crystalline polymer on an interface between the separator and the thermoplastic resin in a direction approximately perpendicular to the interface.

5. The method for manufacturing the fuel cell according to claim 1,
wherein the crystalline polymer includes an olefin-based thermoplastic polymer.

6. The method for manufacturing the fuel cell according to claim 1, wherein the membrane electrode assembly includes an electrolyte membrane and catalyst electrodes disposed on both surfaces of the electrolyte membrane.

* * * * *